US007603330B2

(12) United States Patent
Gupta et al.

(10) Patent No.: US 7,603,330 B2
(45) Date of Patent: Oct. 13, 2009

(54) META LEARNING FOR QUESTION CLASSIFICATION

(75) Inventors: Rakesh Gupta, Mountain View, CA (US); Samarth Swarup, Urbana, IL (US)

(73) Assignee: Honda Motor Co., Ltd., Tokyo (JP)

( * ) Notice: Subject to any disclaimer, the term of this patent is extended or adjusted under 35 U.S.C. 154(b) by 285 days.

(21) Appl. No.: 11/410,443

(22) Filed: Apr. 24, 2006

(65) Prior Publication Data
US 2007/0203863 A1      Aug. 30, 2007

Related U.S. Application Data

(60) Provisional application No. 60/764,412, filed on Feb. 1, 2006.

(51) Int. Cl.
*G06N 3/02* (2006.01)
*G06N 3/08* (2006.01)
(52) U.S. Cl. .......................................... 706/20; 706/25
(58) Field of Classification Search .................. 706/20, 706/25
See application file for complete search history.

(56) References Cited
U.S. PATENT DOCUMENTS

| 4,638,445 A | 1/1987 | Mattaboni |
| 4,884,217 A | 11/1989 | Skeirik et al. |
| 5,392,382 A | 2/1995 | Schoppers |

(Continued)

FOREIGN PATENT DOCUMENTS

WO     WO 02/057961 A2     7/2002

OTHER PUBLICATIONS

Fei et al., Question Classification for E-learning by Artificial Neural Network, 2003.*

(Continued)

*Primary Examiner*—David R Vincent
*Assistant Examiner*—Nathan H Brown, Jr.
(74) *Attorney, Agent, or Firm*—Fenwick & West LLP; Mark Duell

(57) ABSTRACT

A system and a method are disclosed for automatic question classification and answering. A multipart artificial neural network (ANN) comprising a main ANN and an auxiliary ANN classifies a received question according to one of a plurality of defined categories. Unlabeled data is received from a source, such as a plurality of human volunteers. The unlabeled data comprises additional questions that might be asked of an autonomous machine such as a humanoid robot, and is used to train the auxiliary ANN in an unsupervised mode. The unsupervised training can comprise multiple auxiliary tasks that generate labeled data from the unlabeled data, thereby learning an underlying structure. Once the auxiliary ANN has trained, the weights are frozen and transferred to the main ANN. The main ANN can then be trained using labeled questions. The original question to be answered is applied to the trained main ANN, which assigns one of the defined categories. The assigned category is used to map the original question to a database that most likely contains the appropriate answer. An object and/or a property within the original question can be identified and used to formulate a query, using, for example, system query language (SQL), to search for the answer within the chosen database. The invention makes efficient use of available information, and improves training time and error rate relative to use of single part ANNs.

25 Claims, 8 Drawing Sheets

U.S. PATENT DOCUMENTS

| | | | |
|---|---|---|---|
| 5,717,598 | A | 2/1998 | Miyakawa et al. |
| 5,774,632 | A | 6/1998 | Kaske |
| 5,889,926 | A | 3/1999 | Bourne et al. |
| 6,135,396 | A | 10/2000 | Whitfield et al. |
| 6,247,008 | B1 | 6/2001 | Cambot et al. |
| 6,353,814 | B1 | 3/2002 | Weng |
| 6,493,607 | B1 | 12/2002 | Bourne et al. |
| 6,581,048 | B1 | 6/2003 | Werbos |
| 6,604,094 | B1 | 8/2003 | Harris |
| 6,687,685 | B1 | 2/2004 | Sadeghi et al. |
| 6,862,497 | B2 | 3/2005 | Kemp et al. |
| 2002/0129015 | A1 | 9/2002 | Caudill et al. |
| 2003/0093514 | A1 | 5/2003 | Valdes et al. |
| 2004/0111408 | A1 | 6/2004 | Caudill et al. |
| 2005/0278362 | A1 | 12/2005 | Maren et al. |
| 2006/0004683 | A1 | 1/2006 | Talbot et al. |

OTHER PUBLICATIONS

Pratt, Non-literal Transfer Among Neural Network Learners, 1993.*

Waibel et al., Modularity and Scaling in Large Phonemic Neural Networks, 1989.*

Klein, D. et al. "Parsing with Treebank Grammars: Empirical Bounds, Theoretical Models, and the Structure of the Penn Treebank," Proceedings of the 39$^{th}$ Annual Meeting of the ACL, 2001, 8 pages.

PCT International Search Report and Written Opinion, PCT/US06/23554, Mar. 20, 2008, 8 pages.

PCT International Search Report and Written Opinion, PCT/US06/02204, Feb. 13, 2008, 7 pages.

PCT International Search Report and Written Opinion, PCT/US07/61061, Nov. 26, 2007, 8 pages.

PCT International Search Report and Written Opinion, PCT/US06/23822, Oct. 9, 2007, 9 pages.

Zhang, W., "Representation of Assembly and Automatic Robot Planning by Petri Net," IEEE Transactions on Systems, Man and Cybernetics, Mar./Apr. 1989, pp. 418-422, vol. 19, No. 2.

Arroyo, A.A., "A Prototype Natural Language Processing System for Small Autonomous Agents," Machine Intelligence Laboratory, Department of Electrical and Computer Engineering, University of Florida, pp. 1-6.

Baumgartner, P. et al., "Automated Reasoning Support for SUMO/KIF," Max-Planck-Institute for Computer Science, Saarbrucken, Germany, Feb. 4, 2005, pp. 1-18.

Brill, Eric A Simple-Rule Based Part-of-Speech Tagger, Proceedings of ANLP-92, 34d Conference on Applied Natural Language Processing, Trento, IT, 1992, pp. 1-4.

Gupta, Rakesh et al., "Common Sense Data Acquisition for Indoor Mobile Robots," Nineteenth National Conference on Artificial Intelligence (AAAI-04), Jul. 25-29, 2004, pp. 1-6.

Kalinichenko, L.A., "Rule-Based Concept Definitions Intended for Reconciliation of Semantic Conflicts in the Interoperable Information Systems," Institute for Problems of Informatics, Proceedings of the Second International Baltic Workshop on DB and IS, Jun. 1996, pp. 1-12.

Kurfess, F.J., "CPE/CSC 481: Knowledge-Based Systems," Jun. 2005, Retrieved from the Internet<URL:www.csc.calpoly.edu/~fkurfess/Courses/481/Slides/>.

Laskey, K.B., "Knowledge Representation and Inference for Multisource Fusion," Apr. 2002, Retrieved from the Internet<URL:www.msri.org/publications/In/hosted/nas/2002/laskey/1/banner/01.html>.

"Markov Chain," Wilipedia, the free encyclopedia, [online] [Retrieved on Mar. 30, 2006] Retrieved from the Internet<URL: http://en.wikipedia.org/wiki/Markov_chain>.

Matsuda, Y. et al., "Synthesis of Multiple Answer Evaluation Measures Using a Machine Learning Technique for a QA System," Proceedings of the NTCIR-5 Workshop Meeting, Dec. 6-9, 2005, 7 pages.

"Mixed-Initiative Activity Planning," NASA Ames Research Center, 2004, [online] [Retrieved on Nov. 21, 2006] Retrieved from the Internet<URL:http://ic.arc.nasa.gov/publications/pdf/Mixed_Initiative_Act.pdf>.

Russell, S. J., et al., Artificial Intelligence-A Modern Approach, Second Edition, Prentice Hall, Pearson Education, Inc., New Jersey 2003/1995, pp. 462-536.

Setiono, R. et al., "Automatic Knowledge Extraction from Survey Data: Learning $M$-of-$N$ Constructs Using a Hybrid Approach," Journal of the Operational Research Society, 2005, pp. 3-14, vol. 56.

Soricut, R. et al., "Automatic Question Answering: Beyond the Factoid," [online] [Retrieved on Nov. 28, 2006] Retrieved from the Internet<URL:http://acl.ldc.upenn.edu/hlt-naacl2004/main/pdf/104_Paper.pdf>.

Stork, David G., "Open Mind Initiative," ICDAR99, Bangalore, India, pp. 1-28.

Eagle, N., et al., "Context Sensing using Speech and Common Sense," Proceedings of the NAACL/HLT 2004 Workshop on Higher-Level Linguistic and Other Knowledge for Automatic Speech Processing, 2004.

Liu, H., et al., "ConceptNet—a practical commonsense reasoning tool-kit," BT Technology Journal, Oct. 2004, p. 211-226, vol. 22, No. 4.

Liu, H., et al., "OMCSNet: A Commonsense Inference Toolkit," 2003, [online] [Retrieved on Jan. 26, 2009] Retrieved from the internet <URL:http://web.media.mit.edu/~push/OMCSNet.pdf>.

Singh, P., et al., "LifeNet: A Propositional Model of Ordinary Human Activity," Proceedings of the Workshop on Distributed and Collaborative Knowledge Capture (DC-KCAP) at KCAP 2003, 2003, 7 Pages.

* cited by examiner

300

| Category | Example |
|---|---|
| Facts-dates | When was Florence Nightingale born? |
| Facts-people | Who is George Bush? |
| Facts-other | What is the population of Greece? |
| Response-to-object-property | What will you do if trash is stinking? |
| Response-to-person-action | Do you know what to do if baby is crying? |
| Implicit-response-to-object-prop | The plants are dry. |
| Implicit-response-to-person-action | The baby is crying. |
| Locations | Where are the car keys |
| Observation-event-time | When did James leave? |
| Observation-object-status | Is there food in the refrigerator? |
| Observation-person-action | Is the baby sleeping? |
| Steps | Do you know how to cook pasta? |
| Web-current-events | What is happening in Iraq? |
| Web-weather | What is the current weather? |

| Question | Mapping when question is categorized correctly |
|---|---|
| 410a — Where is my suitcase? | SQL query: SELECT* from locations where object = "suitcase" — 420a |
| 410b — Do you know what to do if baby is crying? | SQL query: SELECT* from responses where object = "baby" and property = "crying" — 420b |
| 410c — When was Florence Nightingale Born? | Web search engine API query: When was Florence Nightingale born? — 420c |

Fig. 4

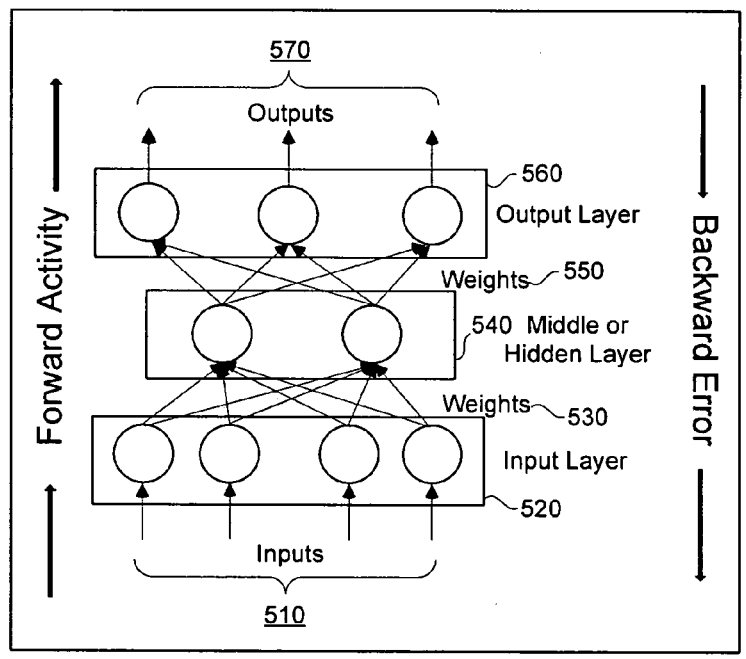

Fig. 5

META LEARNING FOR QUESTION CLASSIFICATION

CROSS REFERENCE TO RELATED APPLICATIONS

This application claims the benefit under 35 USC § 119(e) of U.S. Provisional Patent Application No. 60/764,412, titled "Meta Learning for Question Answering," filed on Feb. 1, 2006, which is incorporated by reference herein in its entirety.

This application is related to U.S. patent application Ser. No. 11/046,343, entitled "Responding to Situations Using Knowledge Representation and Inference," filed Jan. 28, 2005, which is incorporated by reference herein in its entirety.

This application is related to U.S. patent application Ser. No. 11/296,020, entitled "Building Plans for Household Tasks from Distributed Knowledge," filed on Dec. 6, 2005, which is incorporated by reference herein in its entirety.

This application is related to U.S. patent application Ser. No. 11/378,063, entitled "Commonsense Reasoning About Task Instructions," filed on Mar. 16, 2006, which is incorporated by reference herein in its entirety.

FIELD OF THE INVENTION

The present invention generally relates to the field of autonomous machines, and more specifically, to enabling autonomous machines to answer questions.

BACKGROUND

Humanoid robots, for example, robots having human characteristics, represent a major step in applying autonomous machine technology toward assisting persons in the home or office. Potential applications encompass a myriad of daily activities, such as attending infants and responding to calls for information and assistance. Indoor humanoid robots may be expected to perform common household chores, such as making coffee, washing clothes, and cleaning a spill. Additional applications may include assisting elderly and handicapped persons. Humanoid robots will be expected to respond to a number of types of commands and queries from their users. Such queries may span a wide range of subject matter. For example, a query may regard a fact, such as "who is the president?" Another query type may regard a condition, such as "what is the weather?" Yet another query type may regard an observation, such as "is there food in the refrigerator?"

Some systems have manually built question hierarchies. Descriptions of this can be found in D. Moldovan, et al., Lasso: A Tool for Surfing the Answer Net, proceedings of TREC-8, pp 175-183, 1999. An alternate approach recognizes paraphrase variants. For example, Barzilay et al. analyzed 200 two-sentence themes from a corpus and extracted seven lexico-syntacetic paraphrasing rules. These rules covered 82% of syntacetic and lexical paraphrases, which in turn covered 70% of all variants. A description of this can be found in R. Barzilay, et al., Information Fusion in the Context of Multi-Document Summarization, Proceedings of ACL, 1999, which is incorporated by reference herein in its entirety. Qi et al. allowed multiple categories for questions with a probabilistic classifier. A description of this can be found in H. Qi, et al., Question Answering and Novelty Tracks, Proceedings of TREC 2002, The University of Michigan at Trec, 2002, which is incorporated by reference herein in its entirety.

AskMSR used N gram harvesting to use text patterns derived from questions to extract sequences of tokens that are likely to contain the answer, for example, five tokens to the right of "Bill Gates is married to." The approach transformed questions into search engine queries by sample regular expression matching rules, noun-object (NO) parsing or part of speech (POS) tagging, e.g., is Gates married to, Gates is married to, Gates married is to, Gates married to is. Search engine queries were submitted to search engines that searched the Web. The responses were filtered by expected answer type, frequency of occurrence voting, and tiling by combining shorter candidates into longer candidates, for example, United Nations Children's Fund. A description of this can be found in AskMSR: Question Answering Using the Worldwide Web, M. Banko, et al., Proceedings of AAAI Spring Symposium on Mining Answers from Texts and Knowledge Bases, March 2002, which is incorporated by reference herein in its entirety.

Pasca and Harabigiu developed a large taxonomy of question types and expected answer types. A statistical parser was used to parse questions and relevant text for answers, and to build a knowledge base. Query expansion loops were used to add or delete query terms to retrieve an acceptable number of paragraphs to process further to extract answers. Once the question was categorized, it could be answered using an appropriate knowledge source. For example, for weather-related questions, a weather website would be appropriate. For definition questions, a dictionary definition, a general encyclopedia entry, or a domain specific article might be appropriate, depending on the user. A description of this can be found in M. A. Pasca, and S. M. Harabagiu, High Performance Question Answering, Proceedings of the 24th Annual International ACM SIGIR Conference on Research and Development in Information Retrieval, 2001.

Conventional QA systems utilize statistics regarding multiple answer occurrences (using voting, tiling, filtering etc) and also ensure that answers match the expected type. Answers to factual questions are typically named entities (nouns), such as locations, persons and organizations. According to Lehnert, classifying questions is important to avoid answers to questions such as Do you know the time? Yes; How did John pass the exam? With a pen. A description of this can be found in W. Lehnert, A Conceptual Theory of Question Answering, Proceedings of the Fifth international Joint Conference on Artificial Intelligence (IJCAI), 158-164, 1977, which is incorporated by reference herein in its entirety.

Conventional work in Question Answering (QA) has focused on factual QA. For example, the Text Retrieval Conference (TREC) has focused on factoid questions, for which many answers can be found on the Worldwide Web (Web). The TREC system uses word-based classification to determine an answer type for a given question, and uses linguistic techniques like reformation/pattern matching to extract possible answers. For example, for the question "When did Nixon visit China?" the answer type is Date. Reformation of the question accommodates variants like "Nixon visited china in _____," etc. A description of this can be found in A. R. Diekema, et al., Finding Answers to Complex Questions, 2004, in M. T. Maybury, ed., New Directions in Question Answering, AAAI Press/MIT Press, 141-152, which is incorporated by reference herein in its entirety.

Conventional approaches to question classification rely on labeled examples, that is, example questions with paired answers. Unfortunately, labeled examples are relatively scarce and expensive, since manual labeling of example questions is tedious. Furthermore, conventional approaches can involve manual coding of question classification rules, which may break down in exceptional cases. In addition, conventional approaches may accommodate only factual questions. However, relatively few questions asked of an autonomous machine such as a humanoid robot will be factual in nature. Such questions will instead span responses to situations (for example, what to do when baby is crying), inquiries regarding observations and current events, commands and implicit questions (for example, statements offered to elicit a response). Thus, autonomous machines will need real-time access to the appropriate knowledge and information.

From the above, there is a need for a method and apparatus to provide an autonomous machine such as a humanoid robot with access to a variety of sources of knowledge and information, and to enable the autonomous machine to effectively categorize questions to determine which source is most likely to provide the desired answer. Furthermore, this should be accomplished without requiring a substantial number of manually labeled examples and manual coding of question classification rules.

SUMMARY

The present invention includes a system and a method for automatically classifying and answering a question. In one embodiment, a multipart artificial neural network (ANN) is applied to classify a received question as pertaining to one of a plurality of defined categories. The categories can include, for example, facts regarding dates, facts regarding people, response to an object having a property, locations, observations regarding events and times, and so forth. Such classification enables the question to be mapped to one of a plurality of available databases or to the Web. The multipart ANN comprises a main ANN and an auxiliary ANN, each in turn comprising layers of nodes and weights.

Unlabeled data is received from a source, such as a plurality of human volunteers. The unlabeled data comprises a set of supplemental questions that might be asked of an autonomous machine such as a humanoid robot. The unlabeled data is used to train the auxiliary ANN in an unsupervised mode, whereby an a priori defined answer is not required. The unsupervised training can comprise multiple auxiliary tasks, such as generating part-of-speech tags for the words in the supplemental questions, predicting a wh-word (e.g., what, where, how) from the remaining words in the supplemental questions, and predicting a syntacetic relation-tuple between two words of an supplemental question. The auxiliary tasks generate labeled data from the unlabeled data, thereby learning an underlying predictive or functional structure.

Once the auxiliary ANN has trained, the weights are frozen and transferred to the main ANN. This transfers the predictive structure to the main ANN, a process referred to as inductive transfer. The main ANN can then be trained using labeled questions, for example, questions having paired answers. The original question to be answered is then applied to the trained main ANN, which assigns one of the defined categories. The assigned category is used to map the original question to the database that most likely contains the appropriate answer.

In one embodiment, an object and/or a property are identified within the original question to be answered. The object and/or property are used to formulate a query using, for example, system query language (SQL) to search for the answer within the chosen database.

In practice, labeled data may be relatively unavailable and costly to obtain, while unlabeled data may be relatively plentiful and easily obtained. Thus, the invention makes efficient use of available information. Furthermore, application of the multipart ANN and unlabeled data improves training time and error rate relative to single part ANNs.

BRIEF DESCRIPTION OF THE DRAWINGS

The Figures and the following description relate to preferred embodiments of the present invention by way of illustration only. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

FIG. 3 illustrates question categories according to one embodiment of the present invention.

FIG. 4 illustrates mappings from questions to a database according to one embodiment of the present invention.

FIG. 5 is a schematic illustration of a generic artificial neural network.

DETAILED DESCRIPTION OF THE PREFERRED EMBODIMENTS

A method and apparatus for meta learning for question classification is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the referenced embodiment is included in at least one embodiment of the invention. The appearances of the phrase "in one embodiment" in various places in the specification do not necessarily all refer to the same embodiment.

System Architecture

Figure 1:
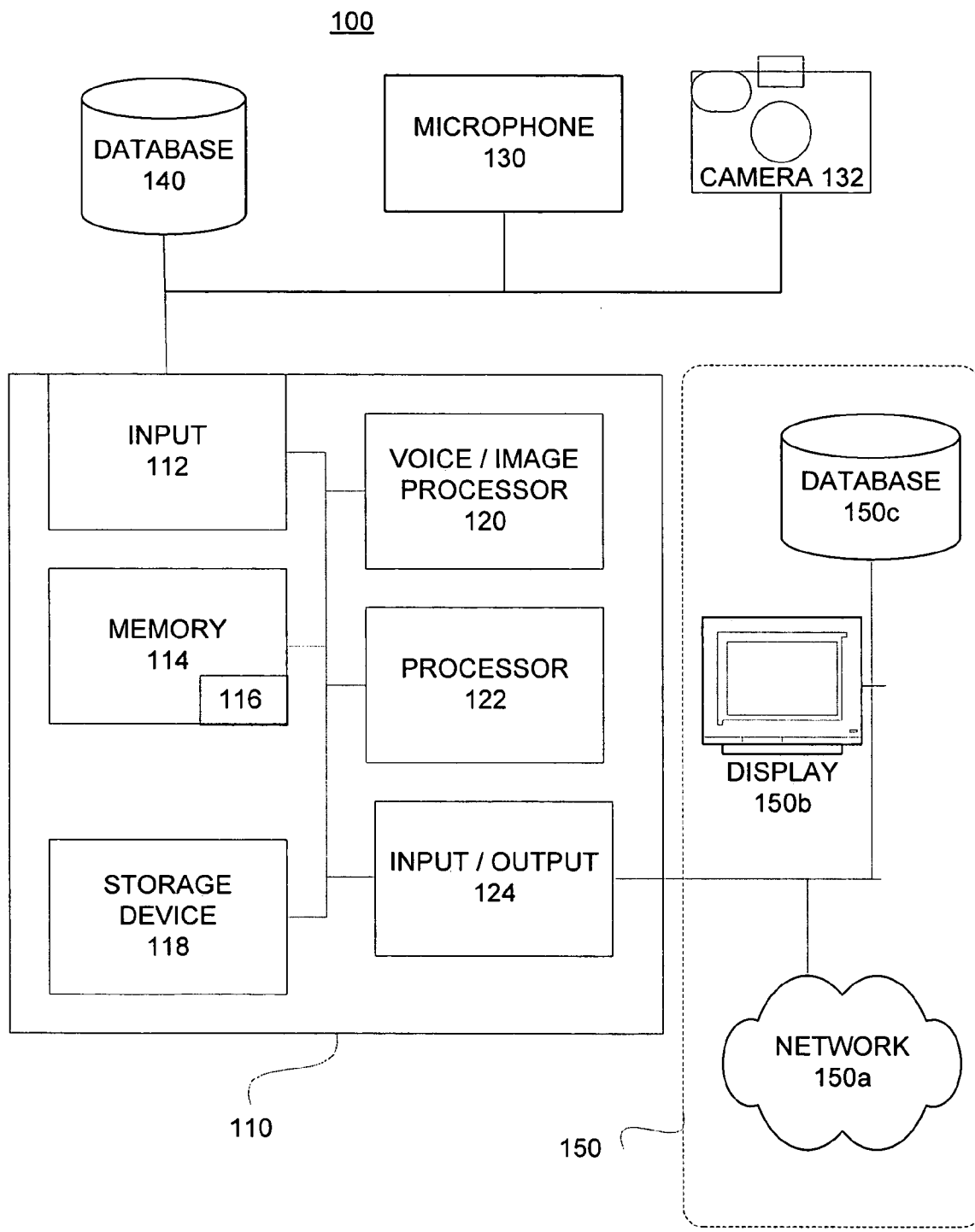
FIG. 1 illustrates a system according to one embodiment of the present invention.

FIG. 1 shows a system 100 according to one embodiment of the present invention. A computer system 110 comprises an input module 112, a memory device 114, a storage device 118, a main processor 122, and an input/output module 124. In an alternative embodiment, a voice/image processor 120 can either be part of the main processor 122 or a dedicated device to receive and process questions or commands from a user. Similarly, memory device 114 may be a standalone memory device, (e.g., a random access memory (RAM) chip, flash memory, or the like), or a memory on-chip with processor 122 (for example, cache memory). Storage device 118 may be any bulk storage device such as a hard disk, DVD-R/RW, CD-R/RW or RAM. Likewise, computer system 110 can be a stand-alone system, such as, a server, a personal computer, or the like. Alternatively, computer system 110 can be part of a larger system, for example, a robot having voice and image processing systems.

According to this embodiment, input module 112 receives information, such as knowledge contributed by human volunteers, from a database 140. Input module 112 may also receive voice utterances directly from a microphone or similar device 130, as well as images from a camera or video capture device 132. Alternatively, input module 112 may be an interface to receive information from a network system, for example, another database, another audio system, Internet servers, or the like. The network interface may be a wired interface, such as a USB, RS-232 serial port, Ethernet card, or the like, or may be a wireless interface module, such as, a wireless device configured to communicate using a wireless protocol, e.g., Bluetooth, WiFi, IEEE 802.11, or the like. Voice/image processor 120 can pre-process voice commands or questions or images received through the input module 112, to convert the voice commands or questions or images to the preferred format on which processor 122 operates.

Information is stored in the memory device 114 to be processed by processor 122. Processor 122 applies a set of instructions that when executed perform one or more of the methods according to the present invention, e.g., answering a question or executing a command. Memory device 114 may include, for example, a module of instructions 116 for such answering or execution.

Processor 122 may exchange information through input/output module 124 to an external device 150, e.g., a network element or server 150a, a display device 150b, a database 150c or the like. Network element or server 150a may connect to other networks, such as the Internet, and may thereby access information from sources such as the Worldwide Web (Web). As with input module 112, input/output module 124 can be wired or wireless. Input/output module 124 may be a storage drive interface, (e.g., a hard-drive or optical drive driver), a network interface device (e.g., an Ethernet interface card, wireless network card, or the like), a display driver (for example, a graphics card, or the like), or any other device for outputting the information or responses determined. In addition, input/output module 124 may interface appropriately with the systems of the autonomous machine responsible for effecting mechanical functionality.

Question Classification

Figure 2:
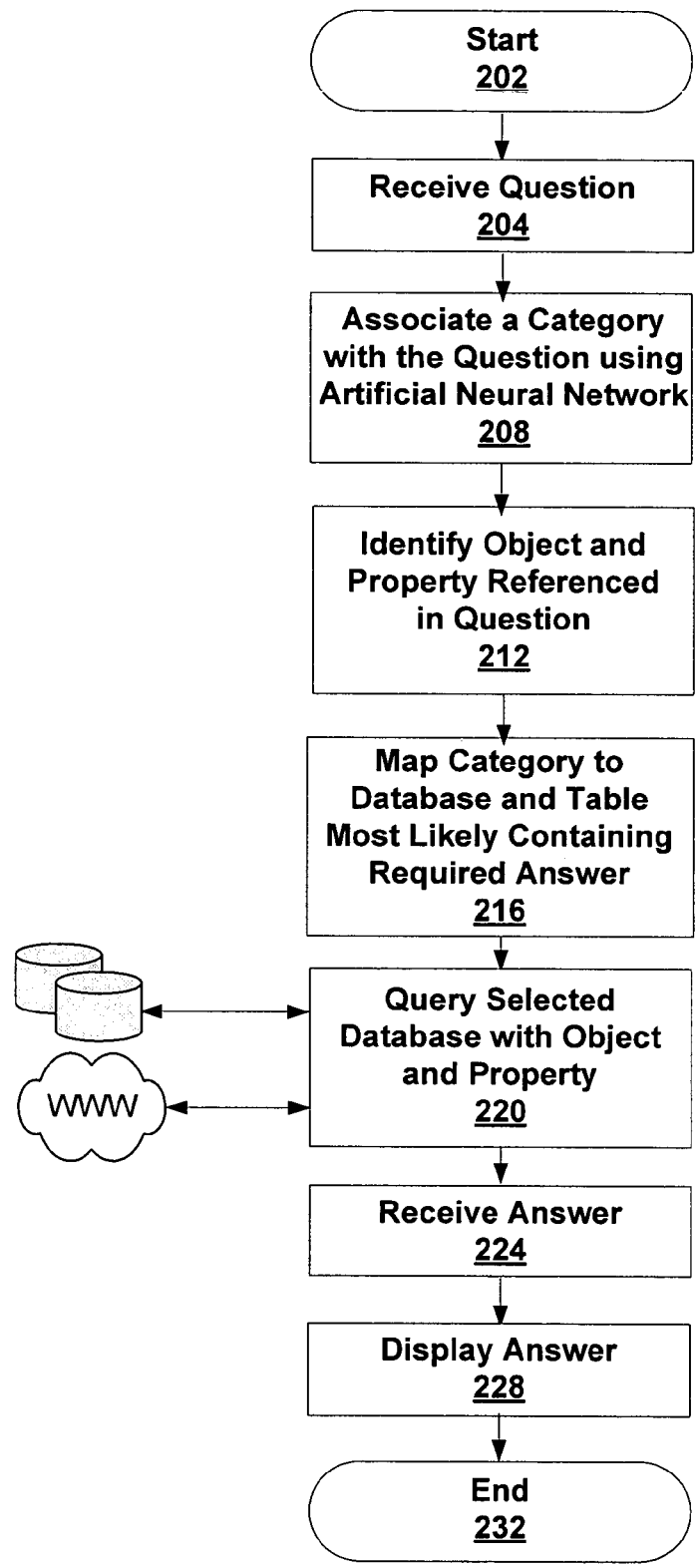
FIG. 2 illustrates a method for answering a question according to one embodiment of the present invention.

FIG. 2 is a flow diagram showing a method for automatically classifying and answering a question according to one embodiment of the present invention. A question is received 204, for example, via microphone 130 and input module 112. The received question is interpreted and associated 208 with a question category using an artificial neural network (ANN). Details of the configuration and operation of the ANN are given below. In one embodiment, a set of question categories is predefined, such as category set 310 shown in table 300 of FIG. 3. The question categories 310 include the following:

310a Facts-dates: dates on which specified events occurred (or will or may occur)

310b Facts-people: information about identified persons

310c Facts-other: information about specified subject matter other than events and persons 310d Response-to-object-property: possible actions that a person, humanoid robot or other autonomous agent could take in response to a query regarding a specified object and property 310e Response-to-person-action: possible actions that a person, humanoid robot or other autonomous agent could take in response to a query regarding a specified or assumed person and action 310f Implicit-response-to-object-property: possible actions that a person, humanoid robot or other autonomous agent could take in response to a statement regarding a specified object and property 310g Implicit response-to-person-action: possible actions that a person, humanoid robot or other autonomous agent could take in response to a statement regarding a specified or assumed person and action 310h Locations: places where a specified thing exists or may be found 310i Observation-event-time: the time at which a specified event occurred, based on an observation of the event 310j Observation-object-status: the state of an object based on an observation of the object 310k Observation-person-action: the actions of a specified or assumed person based on observation 310l Steps: a sequence of possible actions that a person, humanoid robot or other autonomous agent could take to perform a specified task 310m Web-current-events: information regarding events that are occurring or that have recently occurred 310n Web-weather: information regarding weather conditions within a specified or assumed location Answers to questions or statements corresponding to categories 310a-c and f-k may be most likely found in databases compiled using distributed knowledge capture techniques, such as those described in U.S. Patent Application "Building Plans for Household Tasks from Distributed Knowledge," which is referenced above. Answers to questions or statements corresponding to categories 310d-e can be found in U.S. Patent Application "Responding to Situations Using Knowledge Representation and Inference," which is also referenced above. Answers to questions such as those of categories 310m-n may be most likely found in open databases, such as those available on the Web. The categories in table 300 are merely exemplary, and persons skilled in the art will appreciate that variations of and additions to categories 310 are possible without departing from the scope of the invention.

Returning to FIG. 2, according to one embodiment, an object and a property, if any, referenced in the question are identified 212. Consider, for example, the question "Do you know what to do if baby is crying?" The referenced object is "baby," and the referenced property is "crying." The identified category, object and property are used to formulate a query to be mapped 216 to a database (and possibly to a table within the database) that most likely contains the appropriate answer. Examples of such mappings based on System Query Language (SQL) are shown in table 400 of FIG. 4. As shown, answers to the present example question 410b could be found by querying 220 a database using mapping 420b, that is, based on responses to situations within the database wherein an associated object is "baby" and an associated property is "crying." Similarly, an answer to another example question 410a that includes the object "suitcase" (but does not include a property) could be found using mapping 420*a*. An answer to example question 410*c* could be found by performing a Web search using a search engine, based, for example, on mapping 420*c*.

Once the answer to the question is received 224 from the database query, it can be displayed 228, for example on display 150*b*. Alternately, the answer can be audibly communicated to the user based on voice synthesis performed by voice/image processor 120. Persons skilled in the art will appreciate that other uses of the received answer are possible depending on the autonomous machine, user, environment and circumstances of operation.

Artificial Neural Network

As stated, received questions are interpreted and associated 208 with a question category using an artificial neural network (ANN). ANNs are useful for problems for which an algorithmic solution may not be available, but for which many examples of associated behavior are available, and where a structure is discernable from available data. A generic ANN can be understood by reference to the schematic diagram 500 of FIG. 5. Multiple inputs 510 are received and are represented by a set of nodes 520 that comprise an input layer. A first set of weights 530 (for example, multipliers) operates on input layer nodes 520 to yield a set of values summed by another set of nodes 540 that comprise a middle, or hidden layer. The values corresponding to hidden layer nodes 540 are multiplied by another set of weights 550 to produce another set of values summed by the nodes 560 of an output layer. A set of outputs 570 is provided from nodes 560. Outputs 570 can be scaled to occupy a range, for example, from 0 to 1 or from −1 to 1. The process of propagation from inputs 510 to outputs 570 is sometimes referred to as forward activity. The weights 530 and 550 of ANN 500 can be initialized to a default value to yield an initial set of outputs 570 from inputs 510. A description of this can be found in Artificial Neural Networks: An Introduction, K. Priddy and P. Keller, The International Society for Optical Engineering, 2005, which is incorporated by reference herein in its entirety.

ANN 500 is capable of training, that is, adapting to a set of circumstances, by changing the weights 530 and 550 by an amount proportional to the difference between a desired and actual set of outputs 570. This can be done according to supervised training, whereby a "teacher" informs the ANN of the desired response of outputs 570 based on a given set of inputs 510. For example, there can be fourteen outputs 570, each corresponding to a question category 310 as described above. ANN 500 can be configured such that the output 570 having the largest value corresponds to the category determined in response to an input question. Persons skilled in the art will appreciate that a variety of alternate variations of ANN 500 can be configured, according to different methods of determining and indicating a category corresponding to a question.

The desired response of generic ANN 500 can be used to create an error signal that adapts the weights 530 and 550. This is sometimes referred to as backpropagation, or backward error propagation. Thus, with supervised training, a question applied to the set of inputs 510 has an associated desired answer corresponding to outputs 570. The combination of a question and a corresponding correct or desired answer is referred to as a labeled pattern or labeled example. ANN 500 can be trained by repetitively invoking cycles, or epochs, of forward activity and backpropagation, applying a different labeled example and updating the outputs and weights of the ANN during each epoch. This process continues until a desired output error is achieved. At such point, the ANN is said to have converged, or "trained," and the weights can be frozen. A description of this can be found in Priddy, et al., which is referenced above.

A discrete time algorithm for adaptive weight update within an ANN can be formulated according to a gradient-descent method, described by the vector equation $$\Delta w_t = \eta(\partial e/\partial w) + \delta(\Delta w_{t-1}) - \gamma w_t \qquad (1)$$

where $\Delta w_t$ is the set of current weight changes, $\eta$ is a scalar learning rate used to determine the rate at which the weights in the ANN adjust during training, $\partial e/\partial w$ is the partial derivative of error with respect to the weights, and $\delta$ is a momentum factor used to add a proportion of the previous weight change to the current weight change. The momentum factor provides a smoothing effect that can avoid convergence of the weights to a local, rather than global, error minimum. $\Delta w_{t-1}$ is the previous weight change, and $\gamma$ is a weight decay used to prevent instability. According to one embodiment of the present invention, $\eta$ is set to 0.1, and $\delta$ and $\gamma$ are set to zero.

In practice, labeled data required for supervised training may be relatively unavailable and costly to obtain. However, unlabeled data, that is, an input stimulus for which a desired or expected answer is not available a priori, may be relatively plentiful and low in cost. An ANN such as ANN 500 can be configured to adapt purely in response to its inputs 510, so that an a priori defined desired response is not required. Thus, unlabeled data can suffice in place of labeled data. Such an ANN is referred to as an unsupervised ANN. A description of this can be found in Priddy, et al., which is referenced above.

Figure 6:
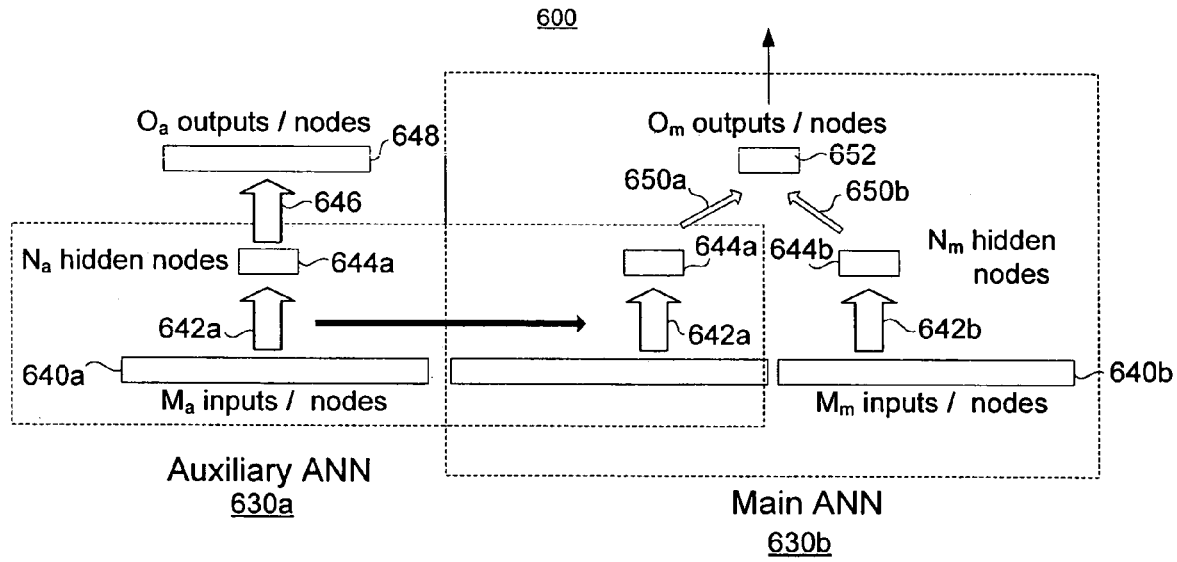
FIG. 6 illustrates auxiliary and main tasks of a multipart artificial neural network according to one embodiment of the present invention.

According to one embodiment of the present invention, an ANN trains using both labeled and unlabeled data. This approach is referred to as semi-supervised learning, and is illustrated in FIG. 6. The unlabeled data is applied to a first ANN 630*a*, referred to as an auxiliary ANN, which generates labeled data from the unlabeled data, thereby learning an underlying predictive or functional structure of the data. For example, unlabeled data can be used to create a data-manifold (graph structure) on which smooth function classes can be defined. This is referred to as structural learning. Auxiliary ANN 630*a* can comprise one or more auxiliary tasks, each serving as a predictor for a unique problem. When multiple predictors for different problems are observed, the underlying predictor space can be analyzed to find the common underlying structures shared by the predictors. Conversely, a common underlying structure can be more reliably learned if it is shared by multiple prediction problems. Once important predictive structures on the predictor space are discovered, the information can be used to improve upon each individual prediction problem. The predictive structure learned from the multiple auxiliary tasks operating on unlabeled data can be transferred to main ANN 630*b*, which operates on the target supervised problem, or main task, using labeled data. This is referred to as inductive transfer. Inductive transfer is more beneficial when the learned underlying structure is helpful for the target supervised problem. If the problem solved by an auxiliary task is related to the main task, the inductive transfer should help solve the target problem. Thus, the problem addressed by an auxiliary task should be relevant to the problem addressed by the main task. A description of this can be found in A Framework for Learning Predictive Structures from Multiple Tasks and Unlabeled Data, R. Ando and T. Zhang, Journal of Machine Learning Research, 2005, which is incorporated by reference herein in its entirety.

In this embodiment, auxiliary ANN 630*a* comprises a set of $M_a$ input nodes 640*a*, a first set of weights 642*a*, a set of $N_a$ hidden nodes 644*a*, a second set of weights 646 and a set of $O_a$ output nodes 648. ANN 630a is trained using unlabeled data as will be described below. Once ANN 630a has converged, the learned predictive structure is transferred to the main ANN 630b, by freezing and transferring weights 642a as shown. In one embodiment, implementation resources within processor 122 corresponding to weights 642a are shared between the auxiliary ANN 630a and the main ANN 630b. In another embodiment, such implementation resources remain separate, and the auxiliary ANN 630a is no longer used following transfer of weights to main ANN 630b.

Main ANN 630b thus includes the $M_a$ input nodes 640a transferred from auxiliary ANN 630 plus $M_m$ input nodes 640b. According to one embodiment, $M_a = M_m$. Main ANN 630b similarly includes a first set of weights 642a and 642b, a set of $N_a$ and $N_m$ hidden nodes 644a and 644b, respectively, and a second set of weights 650a and 650b. Main ANN 630b also comprises an output layer 652 and a set of $O_m$ output nodes. An ANN such as main ANN 630b is sometimes referred to as a multi-part neural network, or MPNN, as it combines parts of separate neural networks with a common output layer. In one embodiment, $O_m$ is equal to the number of question categories, such as fourteen according to the present example. In this embodiment, the outputs of nodes 652 can be processed by a detection circuit or algorithm to indicate the category determined for an input question. The detection circuit can implement a threshold that can be adjusted to realize an optimum tradeoff between probabilities of correct and false detection. This tradeoff is sometimes referred to as selecting a point on a receiver operating curve, based on analogy to radar receiver design. A description of this can be found in Priddy, et al., which is referenced above.

Figure 8:
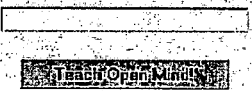
FIG. 8 illustrates an interface for receiving unlabeled data according to one embodiment of the present invention.
Figure 7:
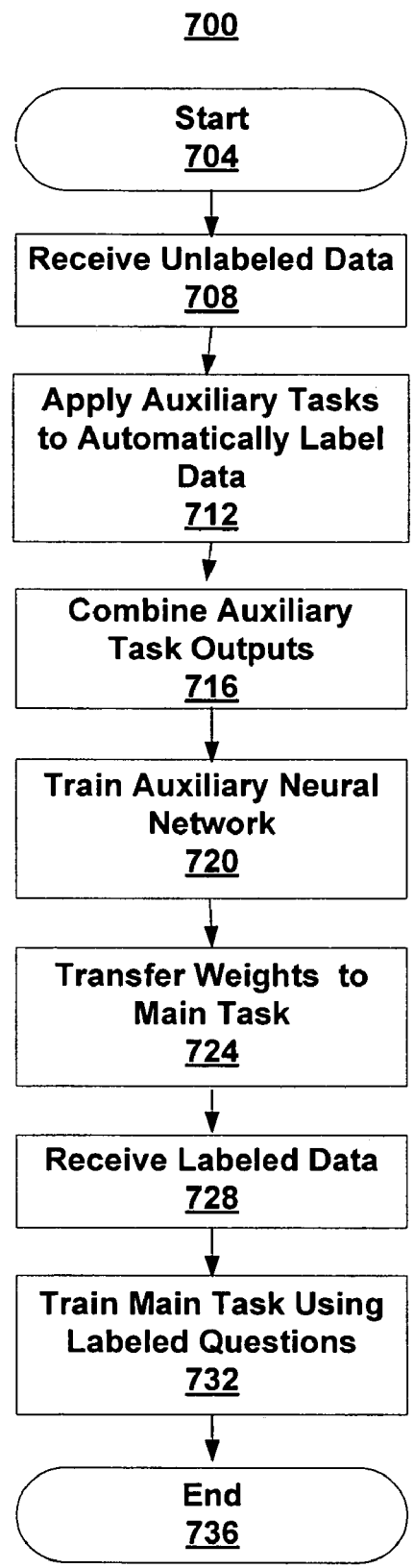
FIG. 7 illustrates a method of applying a multipart artificial neural networks according to one embodiment of the present invention.

Referring now to FIG. 7, a flow diagram 700 shows a method for training ANNs 630a and 630b according to one embodiment of the present invention. Unlabeled data is received 708. Such data can comprise, for example, questions contributed by geographically distributed human volunteers via the Web, in response to prompts such as that shown in FIG. 8. Such methodology is effective because data can be obtained from a wide variety of subjects, thus constituting a consensus, or "commonsense." Additional information regarding distributed data capture techniques can be found in U.S. Patent applications "Responding to Situations Using Knowledge Representation and Inference" and "Commonsense Reasoning About Task Instructions," which are referenced above.

The unlabeled data should be obtained judiciously to avoid inherent bias. For example, if the prompts are not well composed, they can suggest the kinds of questions that are expected from the subjects. In addition, some kinds of questions may be easier for subjects to think of than others, and thus may be entered more frequently. Thus, care should be taken when choosing such questions to compensate for data skew, and to balance the number of questions in each question category. Also, a preponderance of data within a few question categories can make question classification more difficult, since some question categories will be learned from fewer examples than others.

Auxiliary ANN 630a is trained to automatically label 712 the received question. According to one embodiment, auxiliary ANN 630 comprises three auxiliary tasks. Each auxiliary task performs a particular type of analysis on the unlabeled data, and thus can assign a particular type of label. One auxiliary task predicts the "wh-word," e.g., the words "what," "where," or "how" from the remaining words in the received question. Another auxiliary task predicts part-of-speech bigrams and trigrams for successive words in the received question, for example, identifying the sequence verb-noun-preposition or noun-noun-verb.

Figure 9:
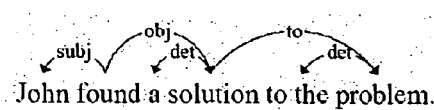
FIG. 9 illustrates a set of syntactic relation tags within a sentence.

A third auxiliary task predicts syntacetic relation-tuples between words in the question. This can be done, for example, using the MINIPAR broad coverage dependency parser. This parser produces a dependency tree that represents the syntacetic relations between words by tuples of the form category1:relation:category2. Each category is the part of speech label of words in the question, for example, NN for noun and VB for verb. The relation is the directed syntacetic relationship between the two categories (for example, OBJ for object, SUBJ for subject, CONJ for conjunction), and corresponds to a link in the dependency tree. For example, in the question "What will you do if baby is crying?" cry [VB] is the subject [SUBJ] of baby [ ], and the corresponding syntacetic relation is VB:SUBJ:NN. A set of syntacetic relation tags for the sentence "John found a solution to the problem" is shown in FIG. 9. A description of this can be found in Dependency Based Evaluation of Minipar, Workshop on the Evaluation of Parsing Systems, Granada, Spain, 1998, which is incorporated by reference herein in its entirety.

In this embodiment, the three auxiliary tasks described above are learned in parallel by combining 716 their outputs within a single output layer 648, and then training 720 ANN 630a as a whole. Once ANN 630a has trained, the weights 644a are held constant (frozen) and transferred 724 to main ANN 630b. Labeled data, for example, labeled questions, is received 728. The main ANN 630b is then trained 732 using the labeled data. The transferred weights represent an inductive bias, as they restrict the main ANN 630b to look in a particular region of weight space, thereby reducing the hypothesis space available to main ANN 630b. The concept behind this is enabling the main task to extract new features from the labeled input data that might be important for the main task, but that may not have been important for the auxiliary tasks. The process of learning underlying structure through auxiliary tasks is referred to as meta learning.

By way of example, for the question "When was Florence Nightingale born?" the proper nouns would be replaced with the symbol NNP, resulting in "When was NNP NNP born?" The nodes of the $M_a$ input nodes representing the words or symbol "when," "was," NNP and "born" (for example, nodes 23, 29, 99 and 103) will have the value 1. Let the adjective "when" be denoted by ADJ, the verb "was" by VB, the noun symbol NNP by NN, and the verb "born" by VB. According to Minipar, "was" is a subject of "Florence Nightingale" and "born" is an object of Florence Nightingale; thus, two relations in this sentence are VB:s:NN and VB:obj:NN. The input nodes corresponding to these relationships (for example, nodes 620 and 633) will have the value 1. Similarly, the inputs corresponding to the trigrams [ADJ VB NN], [VB NN NN] and [NN NN VB] (say nodes 812, 820 and 830) will also have the value 1. The value of the other input nodes will be 0.

The auxiliary tasks described above are merely exemplary, and persons skilled in the art will appreciate that such auxiliary tasks may vary in type and number without departing from the spirit of the invention. Also, auxiliary tasks may be carried out in serial or parallel. Furthermore, auxiliary tasks can operate on labeled data as well as on unlabeled data.

Machine learning error comprises estimation error and approximation error. Estimation error arises in estimating the best hypothesis from the hypothesis space. The larger the hypothesis space, the more difficult it is to find the best available hypothesis. Approximation error arises from the difference between the best hypothesis in the available hypothesis space and the true classifier, for example, a question classifier. The smaller the hypothesis space, the more likely it is that the best available hypothesis will be a poor approximation to the true classifier. Thus, a small hypothesis space is desirable to reduce estimation error, while a large one is desirable to reduce approximation error. This is known as the bias/variance tradeoff. Metalearning seeks to identify a hypothesis space that achieves both low approximation error and low estimation error by learning multiple related tasks.

One formulation of supervised learning seeks a predictor that maps an input vector X to the corresponding output Y. Usually, the predictor is selected from a set H of functions based on a finite set of training examples that are independently generated according to an unknown probability distribution D. The set H, called the hypothesis space, consists of functions that can be used to predict the output Y from the input X. A goal is to find a predictor whose error with respect to D is small. The quality of the predictor p can be measured by a loss function with respect to D. Consider that there are m learning tasks, and a set of hypothesis spaces, $H_\theta$, where $\theta$ is a common structural parameter used to index the hypothesis spaces. The metalearning problem, then, is to learn the value of $\theta$ that minimizes the average expected risk of the predictors on the m tasks. This can be posed as a joint optimization problem over the m tasks as described by the following equation:

$$[\hat{\theta}, \{\hat{f}_l\}] = \operatorname*{argmin}_{\theta \in \Gamma, f_l \in \mathcal{H}_\theta} \sum_{l=1}^{m} \sum_{i=1}^{n} L(f_l(X_i^l), Y_i^l) \quad (2)$$

where L is an appropriate loss function.

This assumes that n examples are available for each of the m learning tasks, and that $\hat{f}_l$ is the hypothesis that minimizes loss on the $l^{th}$ task. It can be shown that when m becomes large, the estimated value of $\theta$ becomes more reliable. Further, given the optimal value of $\theta$, better generalization performance can be realized for a fixed value of n (or a fixed regularization size). A description of this can be found in Ando and Zhang, which is referenced above.

According to one embodiment, $\theta$ is the set of shared weights 642a. Each output 648 of auxiliary ANN 630a corresponds to a separate task from which to estimate $\theta$. The set of hypothesis spaces $H_\theta$ is the space of all the neural network weights, for example, 642a, 642b, 650a and 650b.

Experimental Results

An MPNN according to one embodiment of the present invention was experimentally evaluated. The auxiliary tasks used 548 manually labeled training examples and 3252 unlabeled training examples, with $M_a$=850 inputs. The 3800 total training examples comprised the three tasks described above, namely predicting the wh-word, predicting the Part of Speech bigrams and trigrams, and predicting the syntacetic relation-tuples. These auxiliary tasks were implemented using a common auxiliary ANN and were trained in parallel. Each auxiliary task included multiple outputs. For example, the wh-word prediction task included 20 binary outputs, one for each possible wh-word. The outputs of the three auxiliary tasks were combined to give 649 binary outputs, and thus effectively comprised 649 two-class classification tasks. The auxiliary ANN 630a comprised one hidden layer having $N_a$=20 nodes.

Once auxiliary ANN 630a has trained, the weights 642a were transferred to a main ANN 630b, forming a MPNN. This MPNN comprised 850 inputs that were repeated for each of the auxiliary and main ANNs, as well as $N_m$=20 hidden nodes. The main task trained on the same 548 manually labeled examples. During training of the main ANN 630b, the weights 642a contributed by the auxiliary ANN were frozen. For performance comparison, a second main ANN with 1700 inputs was trained using only the 548 manually labeled examples. The learning of the ANNs was found to not be sensitive to the value of the learning rate $\eta$, which was set to a constant value of 0.1.

Experimental results were obtained with and without inductive transfer (corresponding to the MPNN and second main ANN, respectively). These are shown in graph 1000 of FIG. 10 as curves 1010 and 1020, respectively. Convergence is significantly faster with inductive transfer, since the features extracted by the auxiliary tasks (represented by weights 642a) are useful to the main task. When the main ANN 630b trains, the output layer 652 obtains meaningful information from transferred weights 642a. Also, the back-propagation algorithm tends to modify the weights 650a-b (which are closer to the output layer 652) faster than weights 642a-b, and so can be more attentive to the part of the MPNN with transferred weights. These two factors relating to inductive transfer promote faster convergence. The fact that part of the MPNN is fully trainable ensures that final accuracy with inductive transfer is least as good as without inductive transfer.

Figure 10:
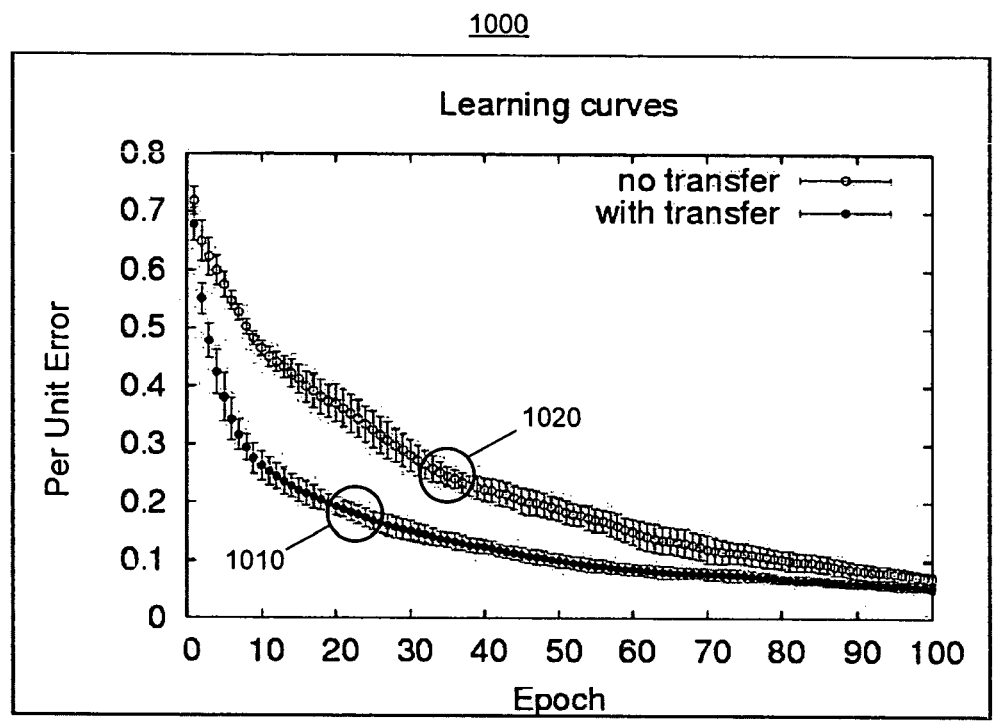
FIG. 10 illustrates learning curves according to experimental evaluation of one embodiment of the present invention.
Figure 11:
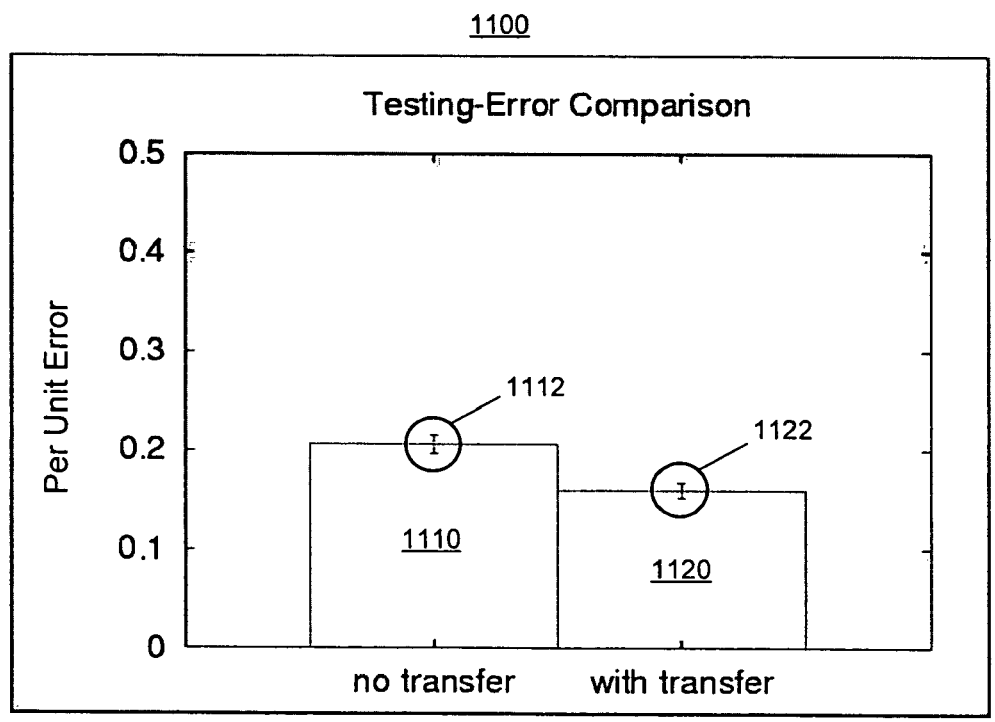
FIG. 11 illustrates testing error according to experimental evaluation of one embodiment of the present invention.

The y-axis of graph 1000 plots error according to a "top-3" algorithm, whereby an output is counted as a misclassification if the correct question category is not in the three highest outputs 652 of the MPNN. For about 65% of the labeled examples, the correct category was actually the top category among outputs 652. The vertical error bars in FIG. 10 are equivalent to one standard deviation, and tend to be smaller with inductive transfer than without. The misclassification rate on the testing set is shown in FIG. 11. This rate drops from 20.65% without inductive transfer to 15.95% with inductive transfer, as shown by error bars 1110 and 1120, respectively.

The vertical lines 1112 and 1122 of FIG. 11 show the corresponding 95% confidence intervals, and do not overlap, which implies that the difference in misclassification rate is statistically significant. Also, these confidence intervals are slightly smaller with inductive transfer than without (0.007 vs. 0.009). If the top category alone is used for question classification (versus the top-3 algorithm discussed above), the error is greater and the difference in the confidence intervals is more marked. This further suggests that ANN learning can be more robust with inductive transfer.

To quantify the effect of inductive transfer, an additional experiment was performed wherein all auxiliary tasks were learned alongside the main task by constructing a single ANN with 663 outputs (14 main task outputs plus 649 auxiliary task outputs) and training this ANN on the 548 labeled examples previously used for the main task alone. This configuration is known as multi-task learning (MTL). The data used for the auxiliary tasks as described above was excluded, since the labels for the main task are not applicable to the auxiliary tasks, and since the large quantity of available auxiliary task data could overwhelm the learning of the main task. A description of this can be found in Multitask learning, Machine Learning, 28, 41-75, R. Caruana, 1997, which is incorporated by reference herein in its entirety.

Figure 12:
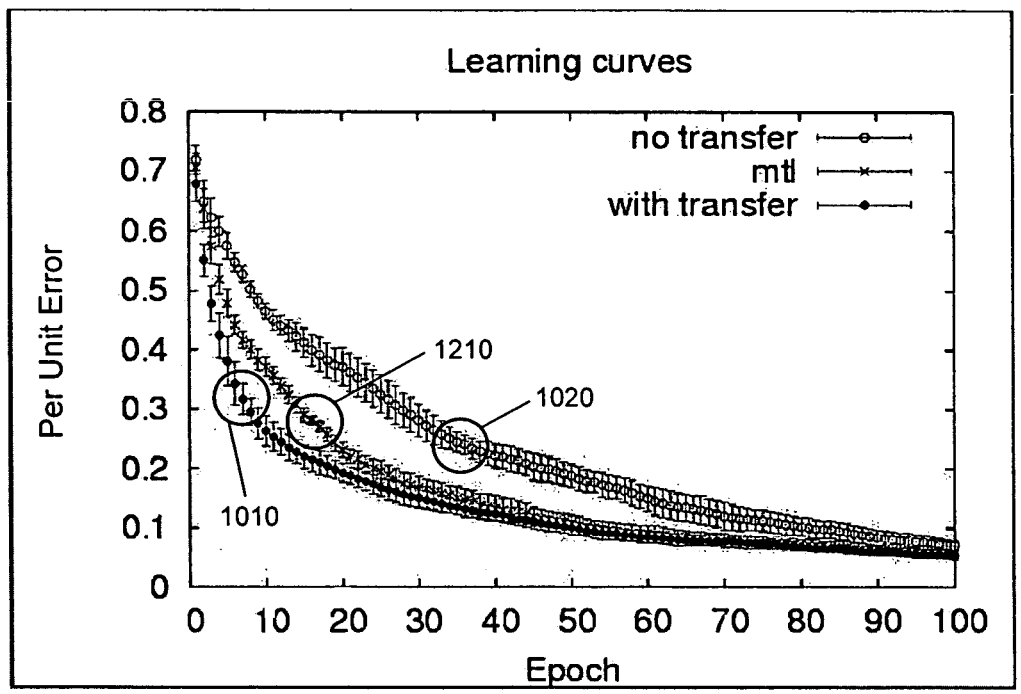
FIG. 12 illustrates learning curves according to experimental evaluation of one embodiment of the present invention.
Figure 13:
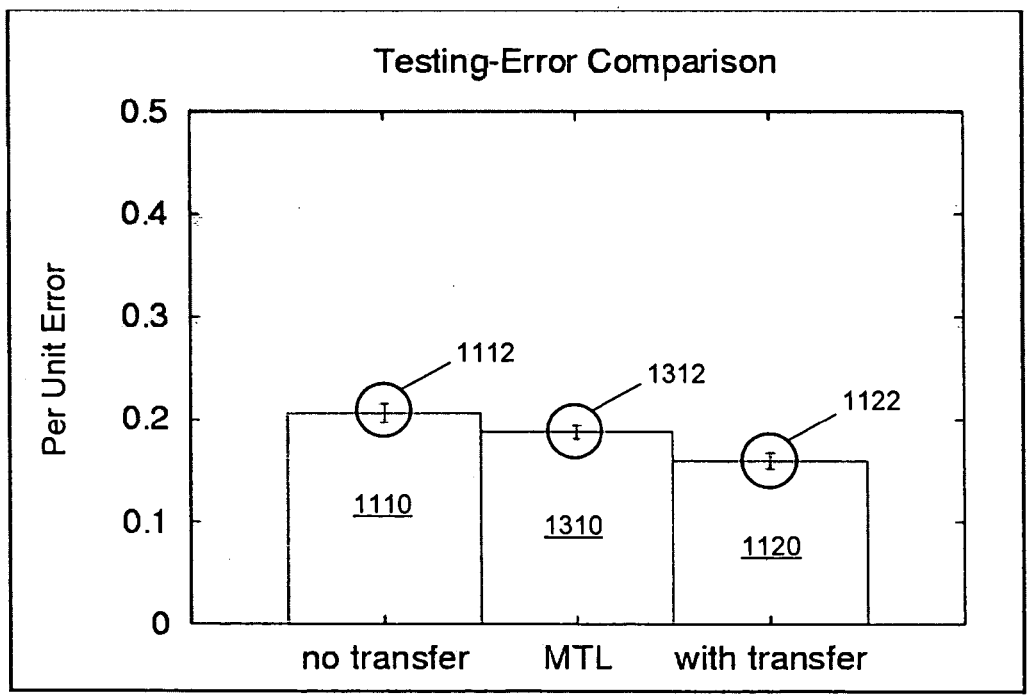
FIG. 13 illustrates testing error according to experimental evaluation of one embodiment of the present invention.

Referring to FIG. 12, the learning curve 1210 for the MTL configuration is shown alongside the previously-shown learning curves 1010 and 1020. The testing set error 1310 is shown alongside the previous testing set errors 1110 and 1120 in FIG. 13. These are the main task errors—in order to provide a fair comparison, they do not include the auxiliary task errors, even though all the tasks are learned simultaneously with a single neural network. As can be seen in FIG. 13, the testing set error 1310 of the MTL falls between that of learning with inductive transfer (1120) and without inductive transfer (1110). This performance was obtained by using 60 hidden layer nodes in the ANN, whereas the MPNN for learning with inductive transfer uses only 40 total hidden nodes 644*a-b*. The data of FIGS. 12-13 appears to demonstrate an additional benefit of inductive transfer from auxiliary tasks.

Advantages of the present invention include efficient use of available information through application of unlabeled data that is relatively plentiful and inexpensive to obtain. Furthermore, application of the multipart ANN and unlabeled data improves training time and error rate relative to a single part ANNs.

Those of skill in the art will appreciate additional alternative designs for a system and a process for automatic question classification and answering. Thus, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention is defined in the appended claims.

The invention claimed is:

1. A computer-implemented method for automatically classifying a first question, the method comprising:
   receiving unlabeled audio or digital text data from an input module, said unlabeled audio or digital text data comprising data that is not previously associated with an expected answer;
   automatically labeling said unlabeled audio or digital text data using a processor to produce first labeled audio or digital text data associating a first answer with the unlabeled audio or digital text data using a first artificial neural network, said first artificial neural network comprising a first set of weights, said first artificial neural network producing the first labeled audio or digital text data by performing one or more auxiliary tasks analyzing characteristics of said unlabeled audio or digital text data;
   transferring said first set of weights to a second artificial neural network;
   receiving second labeled audio or digital text data comprising a second question and a corresponding answer;
   training said second artificial neural network with the processor using said second labeled audio or digital text data by modifying a second set of weights associated with the second artificial neural network responsive to the second labeled audio or digital text data and freezing the first set of weights;
   receiving the first question from the input module; and
   associating a question category with the first question using said second artificial neural network, said question category identifying a source for retrieving text data or audio data describing an answer corresponding to the first question.

2. The method of claim 1, further comprising the step of mapping the first question to a first database of a plurality of databases based on said question category.

3. The method of claim 1, wherein said automatically labeling comprises learning a predictive structure within said unlabeled audio or digital text data.

4. The method of claim 1, wherein said unlabeled audio or digital text data comprises a third question.

5. The method of claim 3, wherein said automatically labeling said unlabeled audio or digital text data comprises at least one of:
   automatically generating a part-of-speech tag for said third question;
   automatically predicting a wh-word from one or more remaining words in said third question; and
   automatically predicting a syntactic relation-tuple between two words in said third question.

6. The method of claim 1, wherein said question category identifies a data source including text data or audio data describing one from the group consisting of: facts-dates, facts-people, facts-other, response to object-property, response to person-action, implicit response to object-property, implicit response to person action, locations, observation-event-time, observation-object-status, observation-person-action, steps, web current events, and web weather.

7. The method of claim 1, further comprising the step of mapping said question category to a system query language (SQL) query.

8. The method of claim 1, wherein said first and second artificial neural networks each comprise an input layer, a hidden layer and an output layer.

9. The method of claim 1, wherein said training said second artificial neural network comprises forward activity and backward error propagation.

10. The method of claim 1, wherein said unlabeled audio or digital text data is contributed by human subjects via distributed data collection.

11. The method of claim 1, further comprising the step of freezing said first set of weights prior to transferring said first set of weights to said second artificial neural network.

12. The method of claim 2, further comprising the step of identifying at least one of an object and a property within said first question.

13. The method of claim 11, further comprising the step of querying said first database according to said object and said property.

14. The method of claim 1, wherein said second artificial neural network comprises a set of output nodes, and said question category is associated with the first question according to the strongest output node of said set of output nodes.

15. An apparatus for automatically classifying a first question, the apparatus comprising:
   an input module configured to:
      receive unlabeled audio or digital text data comprising data not previously associated with an expected answer,
      receive first labeled audio or digital text data comprising a second question and a corresponding answer, and
      receive the first question;
   a processor module configured to:
      automatically label said unlabeled audio or digital text data to produce second labeled audio or digital text data associating a first answer with the unlabeled audio or digital text data using a first artificial neural network, said first artificial neural network comprising a first set of weights and producing the second labeled audio or digital text data by performing one or more auxiliary tasks analyzing characteristics of said unlabeled audio or digital text data,
      transfer said first set of weights to a second artificial neural network,
      train said second artificial neural network using said first audio or digital text labeled data by modifying a second set of weights associated with the second artificial neural network responsive to the second audio or digital text labeled data and freezing the first set of weights, and associate a question category with the first question using said second artificial neural network, said question category identifying a source for retrieving text data describing an answer corresponding to the first question.

16. The apparatus of claim 15, wherein said first and second artificial neural networks comprise a multipart artificial neural network.

17. An apparatus for automatically classifying a first question, the apparatus comprising:

means for receiving unlabeled audio or digital text data comprising data that is not previously associated with an expected answer;

means for automatically labeling said unlabeled audio or digital text data to produce first labeled audio or digital text data associating a first answer with the unlabeled audio or digital text data using a first artificial neural network, said first artificial neural network comprising a first set of weights, said first artificial neural network producing the first labeled audio or digital text data by performing one or more auxiliary tasks analyzing characteristics of said unlabeled audio or digital text data;

means for transferring said first set of weights to a second artificial neural network;

means for receiving second labeled data comprising a second question and a corresponding answer;

means for training said second artificial neural network using said second labeled audio or digital text data by modifying a second set of weights associated with the second artificial neural network responsive to the second labeled audio or digital text data and freezing the first set of weights;

means for receiving the first question; and means for associating a question category with the first question using said second artificial neural network, said question category identifying a source for retrieving text data or audio data describing an answer corresponding to the first question.

18. The apparatus of claim 17, wherein said first and second artificial neural networks comprise a multipart artificial neural network.

19. A computer program product, comprising a computer-readable medium having computer program instructions embodied thereon to cause a computer processor to implement a method for automatically classifying a first question, the method comprising:

automatically labeling unlabeled audio or digital text data comprising data that is not previously associated with an expected answer to produce first labeled audio or digital text data associating a first answer with the unlabeled audio or digital text data using a first artificial neural network, said first artificial neural network comprising a first set of weights and producing the first labeled text data by performing one or more auxiliary tasks analyzing characteristics of said unlabeled audio or digital text data;

transferring said first set of weights to a second artificial neural network;

receiving second labeled audio or digital text data comprising a second question and a corresponding answer;

training said second artificial neural network using said second labeled audio or digital text data by modifying a second set of weights associated with the second artificial neural network responsive to the second labeled audio or digital text data and freezing the first set of weights;

receiving the first question; and associating a question category with the first question using said second artificial neural network, said question category identifying a source for retrieving audio data or text data describing an answer corresponding to the first question.

20. The method of claim 1, further comprising:

presenting the audio data or text data describing the answer corresponding to the first question identified by the question category associated with the first question using an output device.

21. The method of claim 1, wherein the source for retrieving text data comprises a database.

22. The apparatus of claim 15, wherein the source for retrieving text data comprises a database.

23. The apparatus of claim 17, wherein the source for retrieving text data comprises a database.

24. The apparatus of claim 19, wherein the source for retrieving text data comprises a database.

25. A method of using a computer to perform the steps of:

receiving unlabeled audio or digital text data from an input module, said unlabeled audio or digital text data comprising data that is not previously associated with an expected answer;

automatically labeling said unlabeled audio or digital text data using a processor to produce first labeled audio or digital text data associating a first answer with the unlabeled audio or digital text data using a first artificial neural network, said first artificial neural network comprising a first set of weights, said first artificial neural network producing the first labeled audio or digital text data by performing one or more auxiliary tasks analyzing characteristics of said unlabeled audio or digital text data;

transferring said first set of weights to a second artificial neural network;

receiving second labeled audio or digital text data comprising a second question and a corresponding answer;

training said second artificial neural network with the processor using said second labeled audio or digital text data by modifying a second set of weights associated with the second artificial neural network responsive to the second labeled audio or digital text data and freezing the first set of weights; and storing said second set of weights associated with the second artificial neural network and said first set of weights.

* * * * *